United States Patent [19]

Combe et al.

[11] Patent Number: 4,651,151

[45] Date of Patent: Mar. 17, 1987

[54] SINGLE-CHANNEL MEASURING HEAD FOR REMOTE METERING APPARATUS

[75] Inventors: Michel Combe, Rueil Malmaison; Georges Alberola, Limay, both of France

[73] Assignee: Electricite de France, Paris, France

[21] Appl. No.: 654,126

[22] Filed: Sep. 25, 1984

[30] Foreign Application Priority Data

Sep. 29, 1983 [FR] France ............................. 83 15513

[51] Int. Cl.⁴ ............................................. G08C 19/16
[52] U.S. Cl. .................................. 340/870.24; 375/22
[58] Field of Search .................... 375/22; 340/870.24, 340/870.19, 870.20, 870.21

[56] References Cited

U.S. PATENT DOCUMENTS 2,917,728 12/1959 Grossman ................. 340/870.19 X
3,962,697 6/1976 Vreeland ................... 340/870.24 X Primary Examiner—Jerry W. Myracle
Attorney, Agent, or Firm—Larson and Taylor

[57] ABSTRACT

The single channel measuring head has a sensor whose output signal is amplified and filtered. A converter provides sequencies of 3 pulses representing a low reference, the measured parameter and a high reference. The time-period between the first two pulses represents the parameter which is measured. The sequencies are sent to a receiver including a converter which constitutes the amplitude of the parameter.

6 Claims, 7 Drawing Figures

SINGLE-CHANNEL MEASURING HEAD FOR REMOTE METERING APPARATUS

BACKGROUND AND SUMMARY OF THE INVENTION

The invention relates to the field of remote metering and more particularly to apparatus for remotely delivering the value of one or several parameters sensed on an apparatus or a machine to be tested or monitored.

Numerous multichannel telemetering systems exist which provide a remote indication or recording of several parameters taken by means of sensors. On the other hand, these systems include a complex measuring head, which is bulky and whose inplantation on a machine often necessitates considerable study and the construction of laborious parts. That occurs for telemetering on rotary machines, where the parts for supporting the head must be attached without modifying the shaft of the machine to a point reducing its mechanical strength, where available space is limited and where however it is often necessary to resist to acceleration. In addition, the electrical supply of such heads requires the presence of additional lines which further complicate the problem, all the more as the head frequently includes an analogue portion and a digital portion which render several supplies necessary and leads to the use of tori for the construction of electric supply transformers. The presence of a considerable magnetic field in electrical rotary machines, results in saturation of these tori and loss of energy supply.

Very often, the possibilities offered by a multichannel telemetering system are unnecessary and a single-channel apparatus would be sufficient to meet the needs, for example for interventions to be carried out rapidly, which only require measurement of a single parameter.

It is an object of the invention to provide a single-channel measuring head whose measurement accuracy is comparable with that of existing complex multichannel heads, which is simple and of low bulk, which has low requirements as regards power supply and which is easily located.

According to the invention, there is provided a single-channel telemetering head comprising a sensor supply, amplification and filtering means, a converter with a duration modulation and transmission of high and low references, enabling the value of the signal received by the converter on reception to be reconstituted, and transmission means.

The low consumption of such a head, which can be produced from analogue components with a low consumption and logic circuits with C-MOS transistors, permits it to operate from a single power source of low voltage and capacity, which may be a battery or an accumulator, without the use of tori sensitve to high electromagnetic fields. The very low consumption gives the head a great self-sufficiency. The assembly, having a low number of components, can be miniaturized and its insertion inside a machine is done at low price, conveniently and rapidly.

The converter comprises advantageously a ramp generator and triggering comparators for delivering square pulses when the ramp reaches three values respectively corresponding to low and high references which are generated locally and to the measured value. The measured value is then represented, after conversion, by a time interval which separates the square pulses representing the low reference and representing occurrence of the measured value. This time interval must be related to the time interval which separates the square pulses representing the passage to the low and high reference values. Any modification of the interval between crossing of the two reference values by the ramp reflect changes of the system and permit, by simple treatment by a receiving unit, to determine corrections to be effected, for example by modifying the charging current of the capacitor generally used in the ramp generator, as a function of temperature.

The square pulses are generally created by monostable devices placed downstream of the comparators, the set or hold period of one of the monostable devices being different from the others so as to enable identification of the square waves by means of a logic circuit included in the receiving unit.

The invention also proposes an apparatus comprising a head of the above-defined type and a receiving unit having a ramp generator or digital restitution converter, actuated by the square pulses coming from the head.

The invention will be better understood on reading the description which follows of a particular embodiment, given by way of example.

SHORT DESCRIPTION OF THE DRAWINGS

DESCRIPTION OF A PARTICULAR EMBODIMENT

Figure 1:
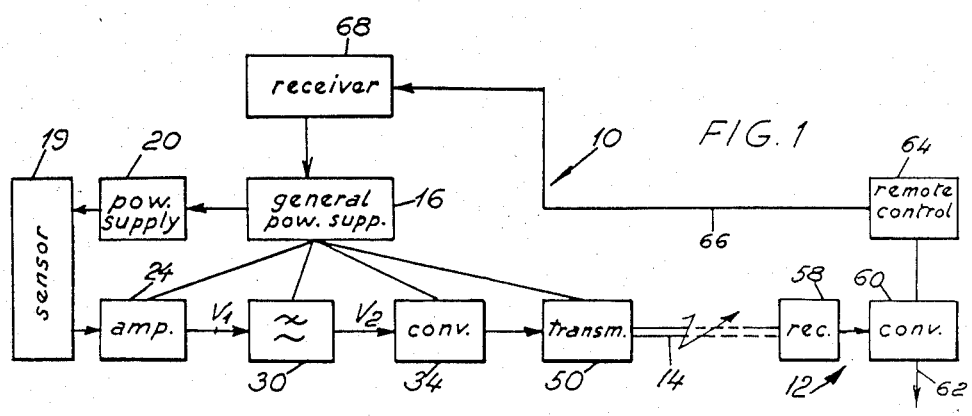
FIG. 1 is a block diagram of an apparatus according to the invention.

Referring to FIG. 1, an apparatus comprises a measuring head 10 carried by the machine of which one operating parameter is to be measured and a receiver 12 placed at a distance and connected to the head by a communication path 14, such as an electric line.

Figure 2:
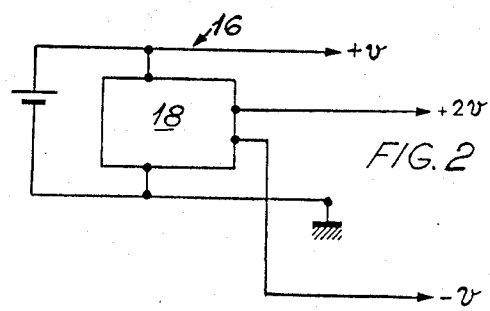

The head 10 comprises a general power supply 16 (FIG. 2) whose energy source may be a battery providing a single voltage $+v$ at least equal to 3 volts. While remaining simple and conventional in construction, the power supply 16 may comprise a voltage converter 18 enabling it to provide voltages $+v$, $-v$ and $+2v$. The supply 16 provides the necessary energy to the measuring sensor 19 through a supply circuit 20 specific to that sensor. In an example, the sensor is constituted by a bridge of resistive strain gauges supplied under a voltage of 3 Volts, with a consumption in the mA range.

Figure 3:
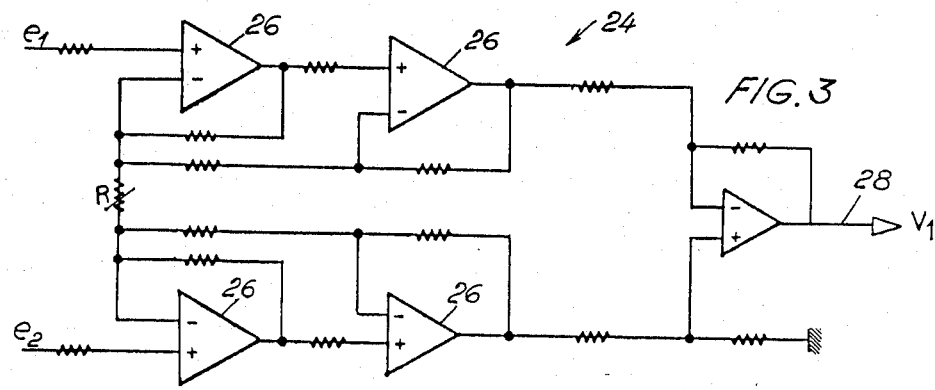

The measuring amplifier 24 will generally be constituted by operational amplifiers supplied by voltages $+v$ and $-v$. As shown in FIG. 3, the amplifier 24, providing a gain of about 400, adjustable by means of a resistor R, is constituted from five operational amplifiers 26 having a low power consumption. The signal from sensor 19 is applied across inputs $e_1$ and $e_2$ and is delivered at 28 after amplification, with a value $V_1$.

Figure 4:
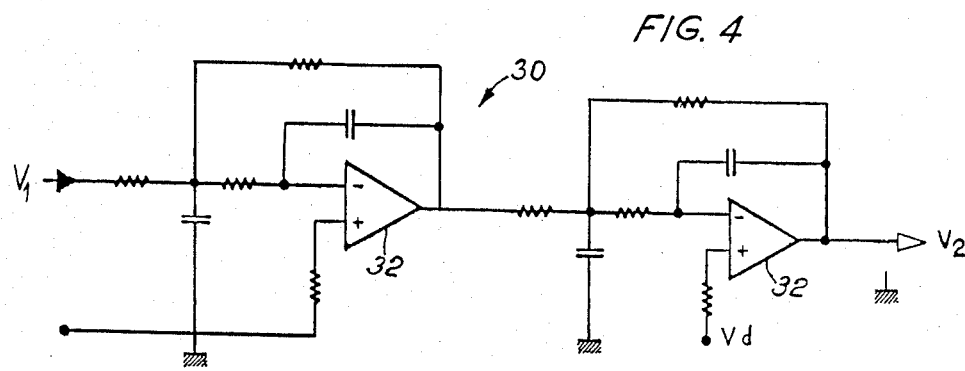

Signal $V_1$ must generally be subjected to low-pass filtering. This operation is fulfilled, in the embodiment shown in FIG. 4, by a Butterworth filter 30 of the 4th order constituted by two operational amplifiers 32 in cascade, having a cut-off frequency of 4000 Hz.

Figure 5:
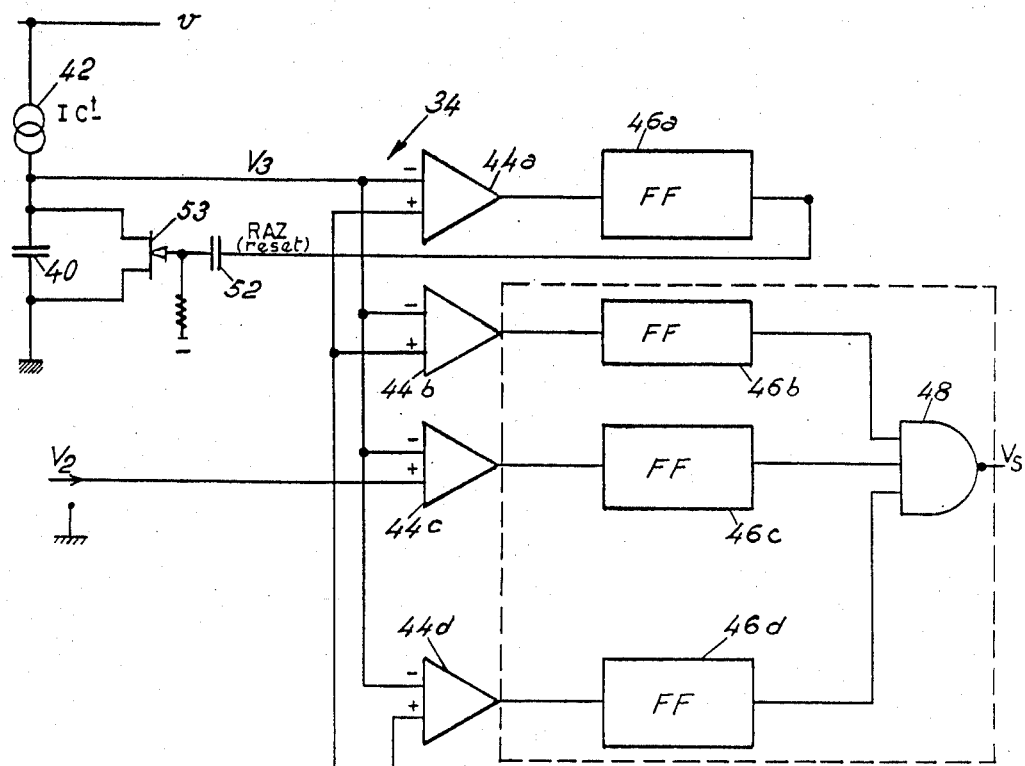
Figure 5:
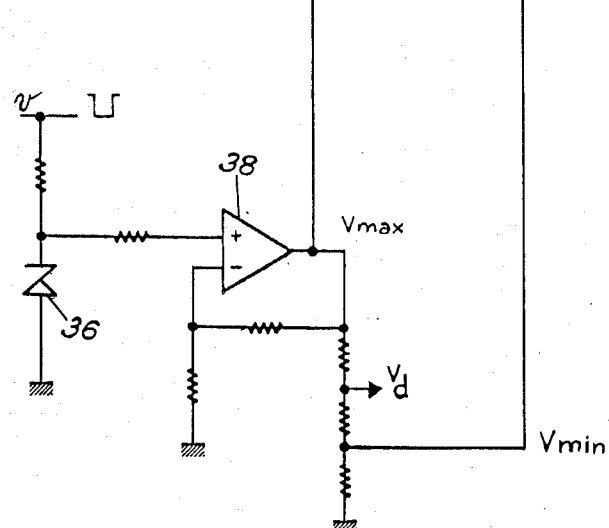

The output signal $V_2$ of filter 30 is supplied to a converter 34 constructed to deliver a time width modulated signal and references for later reconstruction of signal $V_2$. As shown in FIG. 5, the converter 34 comprises a circuit for supplying the two references voltages $V_{max}$ and $V_{min}$. This circuit comprises a Zener diode 36 for stabilizing the voltage applied to an operational amplifier 38 which drives a resistor bridge causing the two voltages $V_{max}$ and $V_{min}$ to appear as well as an intermediate voltage $V_d$ whose role will later appear.

A portion of the converter 34 which generates the modulated signal comprises a triggered ramp generator and channels for comparison and for generation of square pulses. Referring to FIG. 5, the ramp generator comprises a capacitor 40 charged with a constant current by a generator 42 so as to generate a voltage ramp $V_3$ across the capacitor when the FET transistor 53 is non-conducting and permits charge. Voltage $V_3$ is applied to four channels each constituted by a comparator 44a–d followed by a monostable flip-flop 46a–d. The second inputs of the comparators 44b, 44c and 44d receive respectively voltages $V_{max}$, $V_2$ and $V_{min}$. Their outputs are connected, via monostable FFs 46b, 46c and 46d and a common OR gate 48, to a transmitter 50 which applies the signals on the transmission support 14.

Thus, each crossing of one of the values $V_{min}$, $V_2$ and $V_{max}$ by $V_3$ causes transmission of a square pulse by a corresponding monostable FF. The monostable FF and the OR gate 48 are advantageously supplied under +2V in order to operate at high speed; high speed reduces consumption of the transmission system due to shortening of the duration of the transmitted pulses.

Figure 7:
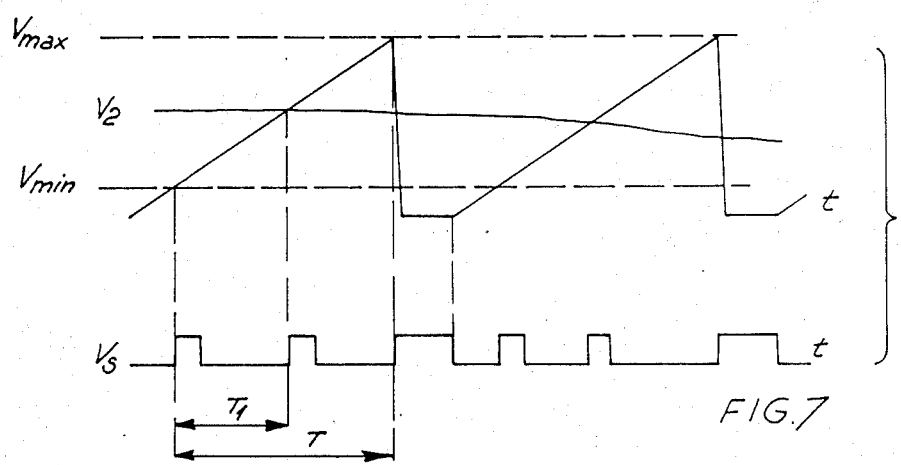
FIG. 7 is a time diagram showing the method of time width modulation by the converter.

The fourth channel, whose comparator also receives the voltage $V_{max}$, is for reset. The output signal of the monostable FF 46a is applied, through a capacitor 52, to a field effect transistor 53 which causes discharge of the capacitor 40 and maintains it at zero during the whole duration of the square pulse, after which the cycle is repeated. The output signal $V_s$ has the shape shown on the second line of FIG. 7, whose first line shows the crossing of the voltage levels $V_{min}$, $V_2$ and $V_{max}$ by the ramp. The duration $T_1$ is proportional to the voltage $V_2$ applied at the input of the converter whereas the time T corresponds to the full scale. The converter can be designed to carry out a measure every 50 μs, which is compatible with the 4 kHz pass band.

Figure 6:
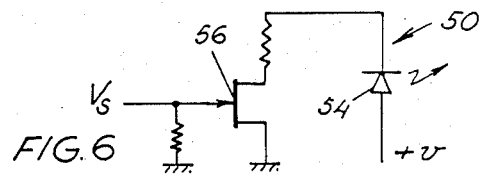
FIGS. 2 to 6 are simplified diagrams showing possible constructions of the power supply, of the measuring amplifier, of the filter, of the converter and of the transmitter of the head of the apparatus of FIG. 1.

The output voltage $V_S$ is applied to the transmitter 50 which will be of a type adapted to the nature of the transmission path 14. If metering is carried out on a stationary unit and transmission is over a length not exceeding some tens of meters, support 14 may be an optical fiber. Thus a transmitter 50 may be used with a light emitting diode 54 controlled by a field effect transistor 56 (FIG. 6). If on the other hand the measurement has to be carried out on a movable member, for example a rotary shaft, a radio frequency transmitter or any other transmitter not using a material transmission support may be used.

The offset voltage Vd enables the output voltage of the amplifier supplied with +V to be brought back within the measuring range of the converter.

Referring to FIG. 1, the receiving unit 12 of the apparatus comprises a receiver 58 adapted to the transmission support 14 and a converter 60 designed to restitute, on its output 62, two analogue output signals, the first representing the measurement, the second representing the "high" reference. It is not necessary to describe in detail the converter 60, which will include a logic unit for the recognition, based on their difference in length, of the square pulses representing the low reference, the measure and the "high" reference. The measure and "high" reference values are stored in S & H circuits. A voltage ramp or saw tooth is delivered by a generator of the same type as that of the converter 34, from the "low" reference square pulse until the "high" reference square pulse. The output signals from the converter 60 may be applied to an A/D converter whose full scale corresponds to the level of the "high" reference.

The apparatus may be designed for temperature compensation. It is known that variations in temperature can modify the value of the capacitor 40 of the converter 34, as well as its charge current I. This change results into variation in the time interval separating the output square pulses of the monostable FFs 46d and 46b (said interval representing the full measuring scale). A calibration in the receiver may be provided to determine the temperature of the head and, particularly, of the measuring amplifier 24 from time duration T. This offset shift, being known, may then be compensated simply in the receiver.

As shown in FIG. 1, the device includes a system for remote control from receiving unit 12. If the transmission support 14 is an optical fiber, remote control may be ensured by a manual unit 64 comprising a LED diode which sends light into an optical fiber 66. The head comprises a remote control receiver 68, whose input member is for example a phototransistor; that receiver will connect the supply source, for example through a VMOS transistor, during the duration of the signals received from unit 64.

Such a remote control system enables, in the case of supply by low capacity batteries or accumulators, to supply the assembly only during the test periods; during such periods measurements may be spaced over time with great flexibility.

By way of example, a measuring head supplied with a 3.4 volt lithium battery of capacity 850 mA-h comprises OP-20 operational amplifiers and C-MOS transistors. The offset drift of the measuring amplifier 24, of about 1.2 μVolt/°C. is determined by measurement of the duration T and corrected by the receiver. The transmission is over an optical fiber, as short pulses to reduce power consumption. The total consumption of the head, including the sensor, does not exceed 4.5 mA.

Numerous modifications of the invention are possible. In particular, the drift corrections can be effected digitally at the receiver, by incorporating a microprocessor in the receiving unit.

We claim:

1. A single channel measuring unit for remote measurement of a parameter, comprising: sensor means adapted to deliver an electrical signal representative of said parameter; means for amplifying and filtering said electrical signal; converter means connected to receive the amplified and filtered signal and constructed to repeatedly deliver time sequences each of three pulses, each of said sequences being representative of an instantaneous value of said electrical signal and comprising a first pulse representative of a predetermined low reference value, a second pulse representative of said electrical signal and a third pulse representative of a predetermined high reference value, with the ratio between the time interval separating said first and second pulses and the time interval separating said first and third pulses being representative of the value of said signal and each of said pulses being of short duration as compared with the duration of one of said time sequences; and transmitter means for delivering said pulses to transmission support means, whereby the value of the signal may be reconstituted on reception.

2. A measuring unit according to claim 1, wherein said unit includes an integrated power supply and said amplification and filtering means are low consumption components.

3. A single channel measuring unit for remote measurement of a parameter, comprising: sensor means adapted to deliver an electrical signal representative of said parameter; means for amplifying and filtering said electrical signal; converter means connected to receive the amplified and filtered signal and constructed to repeatedly deliver time sequences each of three square pulses, each of said sequences being representative of an instantaneous value of said electrical signal and comprising a first pulse representative of a predetermined low reference value, a second pulse representative of said electrical signal and a third pulse representative of a predetermined high reference value, with the ratio between the time interval separating said first and second pulses and the time interval separating said first and third pulses being representative of the value of said signal, and transmitter means for delivering said pulses to transmission support means, whereby the value of the signal may be reconstituted on reception, wherein said converter means comprises a ramp generator and triggering comparators for causing delivery of square pulses when the ramp crosses each of said first, second and third value and said converter means comprises monostable flip-flops triggerable by said comparators, one of said monostable flip-flops being constructed to deliver a pulse different from the pulses from the other flip-flop so as to enable identification of the square pulses.

4. A measuring unit according to claim 3, wherein said ramp generator includes a capacitor, means for charging said capacitor with a current of constant value, and switch means for resetting said ramp generator for short-circuiting said capacitor in response to said third pulse.

5. A remote metering apparatus having:
a single channel measuring unit for remote measurement of a parameter, comprising: sensor means adapted to deliver an electrical signal representative of said parameter; means for amplifying and filtering said electrical signal; converter means connected to receive the amplified and filtered signal and constructed to periodically deliver in sequence pulses representative of a predetermined low reference value, of said amplified and filtered signal and of a predetermined high reference value with a time duration modulation in response to the value of said amplified and filtered signal; and transmitter means for delivering said pulses to transmission support means, whereby the value of the signal may be reconstituted on reception; and
a reception unit having a converter for restituting a signal whose amplitude is representative of said electrical signal, said converter means including a ramp generator controlled by said pulses representative of said low predetermined low reference value and representative of said predetermined high reference value and means for determining any shift due to temperature variations from measurement of the time interval between said pulses representative of said high and low reference use and means for correcting such shifts.

6. Apparatus according to claim 5, further comprising means for remote control of said measuring unit from said reception unit, including means for switching on and off an electric power supply of said measuring unit.

* * * * *